United States Patent [19]
Ahlgren

[11] 3,985,653
[45] Oct. 12, 1976

[54] ROTARY APPARATUS ADAPTED TO BRING AT LEAST TWO MEDIA OF DIFFERENT WEIGHT INTO ALTERNATE CONTACT WITH THE APPARATUS SURFACES

[76] Inventor: Nils Harald Ahlgren, Skyttezagen 22F, 133 00, Saltsjobaden, Sweden

[22] Filed: Apr. 29, 1974

[21] Appl. No.: 465,153

Related U.S. Application Data
[63] Continuation of Ser. No. 188,352, Oct. 12, 1971, abandoned.

[52] U.S. Cl. ............................ 210/150; 210/242 R; 261/92
[51] Int. Cl.² ......................................... B01D 21/00
[58] Field of Search ........... 210/150, 151, 242, 402; 261/92, 120

[56] References Cited
UNITED STATES PATENTS

| | | |
|---|---|---|
| 2,899,068 | 8/1959 | King et al. ........................ 210/402 |
| 3,178,023 | 4/1965 | Wheeler, Jr. .................... 210/402 X |
| 3,335,081 | 8/1967 | El-Naggar .......................... 210/150 |
| 3,442,495 | 5/1969 | Schreiber ........................ 210/151 X |
| 3,576,257 | 3/1970 | Yates .................................. 210/242 |
| 3,595,538 | 7/1971 | Baumann ........................ 261/120 X |
| 3,613,890 | 10/1971 | Hellqvist ............................ 210/150 |
| 3,688,905 | 9/1972 | Nordgard ........................... 210/151 |

*Primary Examiner*—John Adee
*Attorney, Agent, or Firm*—Rose & Edell

[57] ABSTRACT

A rotary apparatus which is adapted to bring at least two media of different density into alternate contact with the apparatus surfaces, preferably for the purification of one medium, is formed by a body which is closed except for ingress and egress apertures and which has means for causing the body to rotate. In the interior the body has contact surfaces for the media. The contact surfaces are so arranged in the body that at least the medium having the greatest density is advanced therethrough at the rotation. The rotary body is a body having buoyancy of its own and is directly supported in the media of greater density inasmuch as it is adapted to rotate supported by these media and automatically to adjust itself to the levels thereof.

10 Claims, 9 Drawing Figures

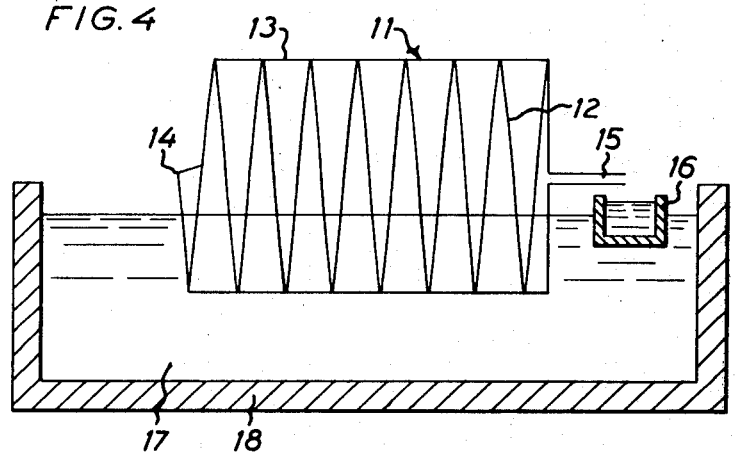
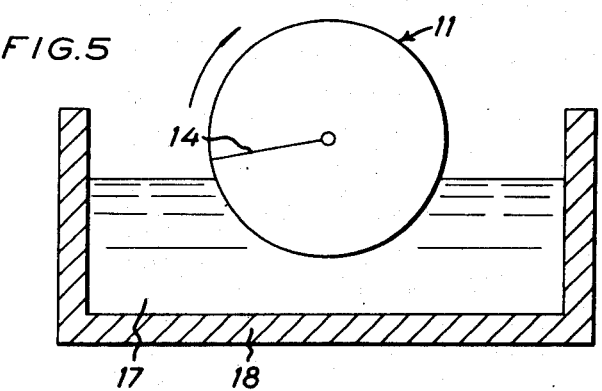
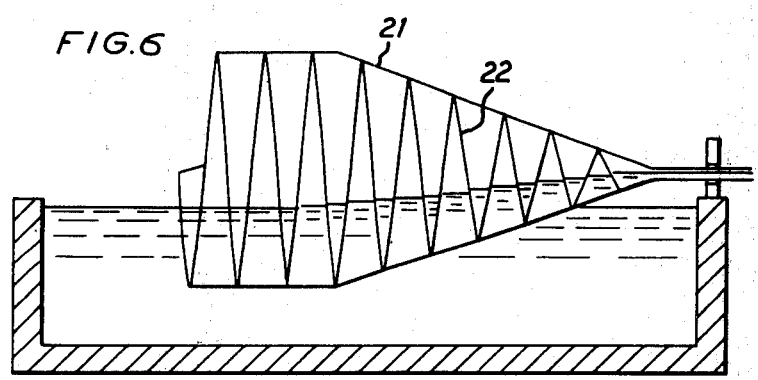

ROTARY APPARATUS ADAPTED TO BRING AT LEAST TWO MEDIA OF DIFFERENT WEIGHT INTO ALTERNATE CONTACT WITH THE APPARATUS SURFACES

This is a continuation of application Ser. No. 188,352, filed Oct. 12, 1971, now abandoned.

This invention relates to a rotary apparatus adapted to bring at least two media of different density into alternate contact with the apparatus surfaces, preferably for the purification of one medium. In the purification of water, which is the most general application, the surfaces of the rotary apparatus which are coated with micro-organisms are partially immersed in the water so that upon rotation said surfaces are alternately located in the water and the air, respectively.

As the water to be purified has to be supplied in sufficient amount and the resulting sludge removed, the rotary apparatus is often built in a fixed position into sewage treatment works where other means have to supply the appropriate amount of water and to carry away the sludge. In some cases, however, the rotary apparatus is a body which is closed except for ingress and egress apertures and has means for causing the body to rotate, contact surfaces for the media being provided within said body and so arranged therein that the water is advanced through said body at the rotation thereof. The invention relates to a closed rotary body of the kind stated and the characteristic features thereof are that it is a body having buoyancy of its own and directly supported in the medium of greater density inasmuch as it is arranged to rotate supported by said medium and automatically adjusts itself to the levels of said medium. In ordinary use the body is thus directly placed in the water inasmuch as it is adapted to rotate supported by it and to adjust itself automatically to the water level. The body having buoyancy of its own takes in water and air at its rotation in such proportions as to occupy a position of balance floating in the water where it can be caused to rotate with a minimum of energy consumption. The rotation can be brought about by means of a flexible drive shaft which also keeps the body in the desired position and permits the water level to be varied, or by means of a drive disposed on a frame associated with said rotary body. The floating body can thus be placed, without any costly installation work, so as to float in the water to be purified, e.g., in the basins of existing sewage treatment works or in polluted lakes.

The invention will be more fully described hereinbelow with reference to the accompanying drawings in which some embodiments, chosen by way of example, of the rotary apparatus are illustrated.

In the drawings:

FIG. 4 is a longitudinal section of the rotary apparatus in another embodiment thereof, when the apparatus has a coil-shaped inner wall;

FIG. 5 is an end view of the apparatus shown in FIG. 4;

FIG. 6 is a longitudinal section of a modified embodiment of the apparatus shown in FIGS. 4 and 5;

Figure 1:
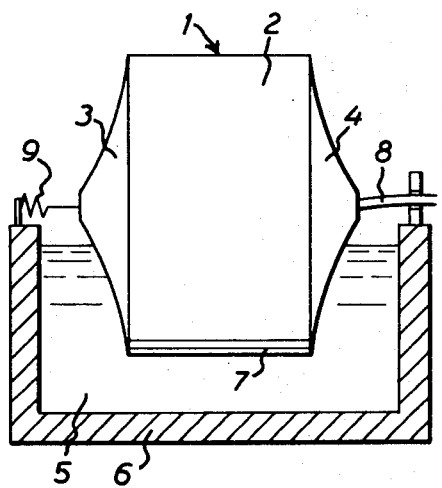
FIG. 1 is a side elevation of the rotary apparatus in one embodiment thereof.
Figure 2:
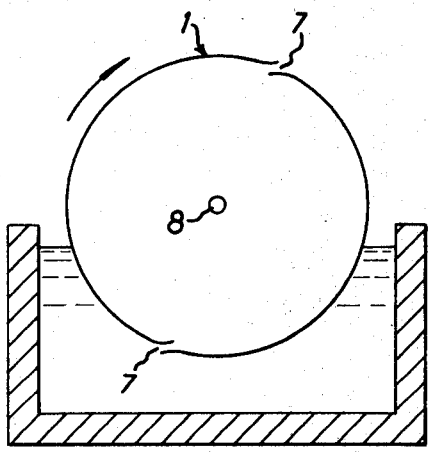
FIG. 2 is an end view of said apparatus.
Figure 3:
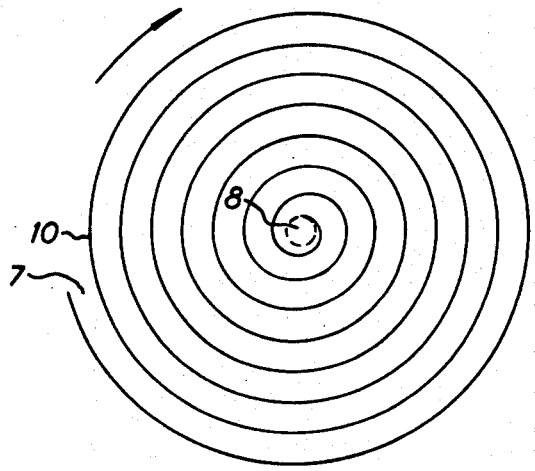
FIG. 3 is an end view a spiral partition of the apparatus.

As will appear from the drawings the rotary apparatus is a body having buoyancy of its own and being directly placed in the water and arranged to rotate therein supported by it. In FIGS. 1 and 2 the body 1 comprises a cylindrical part 2 and two end walls 3 and 4. The body 1 which floats on the water 5 in the basin 6 has one or more ingress apertures 7, which alternately take in water and air when the body is caused to rotate by the drive shaft 8 in the direction of the arrow. The drive shaft 8 is flexible so that it can drive the body independently of the level of the water 5. Moreover, the drive shaft is tubular so as also to serve to take out water. The shaft 8 in conjunction with spring means 9 keeps the body 1 in the desired position.

The spiral partition 10 has but one ingress opening 7 at the periphery whereas the center of the spiral partition 10 is adapted to co-operate with the tubular water take-out shaft 8 at the endwall 4.

The material in the partition 10 and/or the end walls 3 and 4 is of such a nature that the body 1 has buoyancy of its own, i.e. the body 1 will float irrespectively of the amount of water it has taken up. Thus, the partition 10 can be made for example of plastic material of low density.

By the rotation of the body 1 the water and air is taken up by the spiral partition 10 towards the center of the body 1 where the water is taken out through the tubular drive shaft 8. A very high degree of purification is obtained because the water taken up is forced to pass all of the two sides of the spiral partition 10.

With such a configuration of the spiral partition 10 that approximately the same volume will be defined per revolution of the rotary apparatus, e.g. by increasing the radial distance of the spiral towards the center or by giving the end walls 3 and 4 an outwardly bulging configuration, the water quantities taken up per revolution will remain in the lower portion of each spiral convolution and slowly lifted towards the center of the rotor-shaped body 1 by the rotation. If, however, the spiral partition 10 defines a smaller volume per convolution towards the center than it does at the periphery, the water volumes and intermediate air volumes taken up will at times be forced above the apexes of the spiral convolutions, whereby the air volumes will be mixed with the water volumes, so that an increased purification effect will be obtained.

In the embodiment illustrated in FIGS. 4 and 5 the contact surfaces of the rotary body 11 are constituted by a coiled plate element 12, which is mounted to the inner side of a cylindrical wall surface 13 which is concentric with the axis of rotation.

By the rotation of the body 11 water and air are taken in at one end 14 of the body 11, which has no end wall. The water and air taken in are then forced by the coiled plate element 12 to move through the body 11 to the other end thereof where said body has such a configuration that the water is successively lifted towards the axis of rotation of the body 11 to be transferred to the egress means 15 which is a tubular shaft.

The egress means 15 is connected to a U-shaped channel 16 or like member, which is adapted automatically to adjust itself to the level of the water 17 and thus to the level of the egress means 15. In the embodiment illustrated in the drawing this is realized in that the channel 16 is adapted to float on the water 17 in the basin 18. In other embodiments the channel 16 can be directly or indirectly supported by the body 11 having buoyancy of its own.

The modification illustrated in FIG. 6 differs from the apparatus shown in FIGS. 4 and 5 essentially in that the wall surface 21 to the inner side of which the coiled plate element 22 is mounted has been given a partially conical form.

Figure 7:
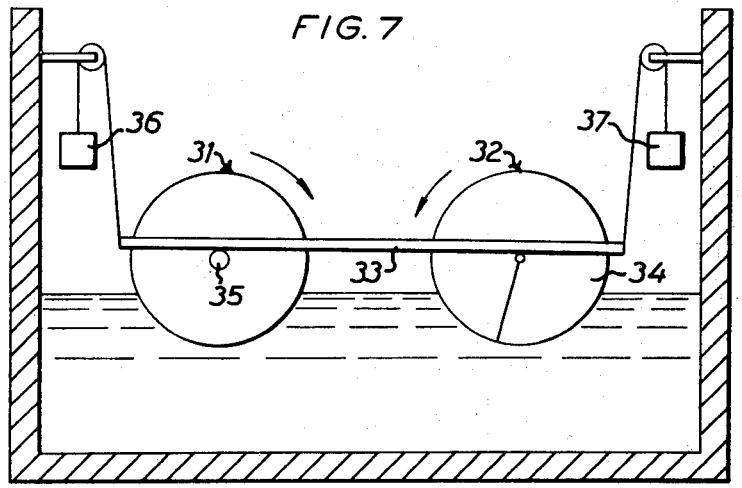
FIG. 7 is an end view of two rotary apparatuses cooperating with a stabilizing frame.

As shown in FIG. 7, two rotary apparatuses 31 and 32 are adapted to co-operate with a stabilizing frame 33. The apparatuses 31 and 32 are arranged to rotate in opposite directions, as shown by the arrows. Moreover, these apparatuses 31 and 32 which have parallel axes of rotation are so located as to have their ingress apertures 34 and egress apertures 35 facing away from each other. By this arrangement the two rotary bodies 31 and 32 have an exceedingly stabilizing effect on one another by the intermediary of the frame 33.

A pair of weights 36 and 37 are hung over return pulleys to have a stabilizing effect on the frame 33. The weights 36 and 37 in principle shall not provide any supporting power for the bodies 31 and 32. In certain cases it is therefore necessary, at least at the start, to weigh down the frame 33.

Figure 8:
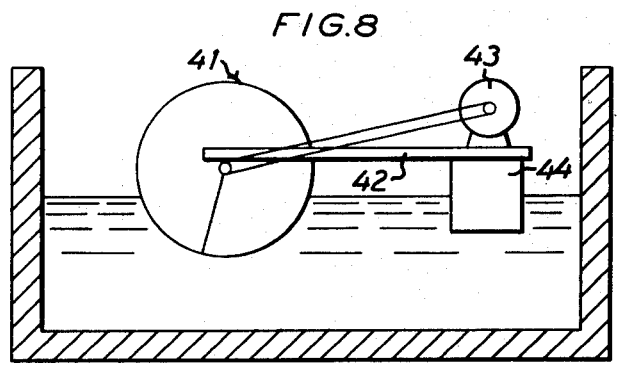
FIGS. 8 and 9 show some embodiments of a rotary apparatus, as seen in end view, co-operating with a stabilizing frame having a drive.
Figure 9:
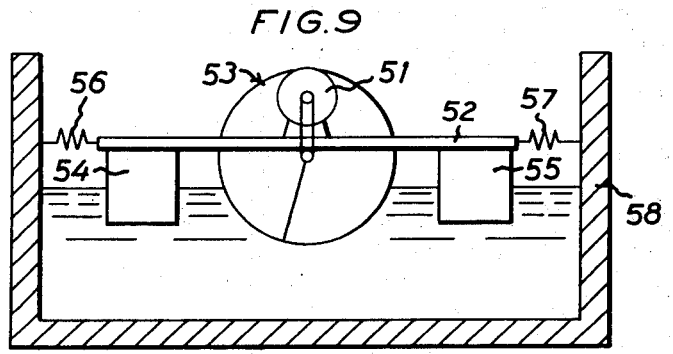

The desired floating position can thus be attained by a stabilizing frame which is carried by one or more rotary bodies. Additional floating bodies can also be used, such as those shown in FIGS. 8 and 9. As shown in FIG. 8 the rotary body 41 has a stabilizing frame 42 which carries the drive 43 for the body 41. The frame 42 is carried both by the body 41 and by the additional floating body 44 as the drive 43 would otherwise produce an oblique load on the frame 42 considering that the drive 43 is eccentrically located. As shown in FIG. 9 the drive 51 certainly is centrally mounted on the frame 52 in relation to the rotary body 53 but also in this embodiment increased stability is brought about by means of additional floating bodies 54 and 55.

In the embodiment shown in FIG. 9 the stabilizing frame 52 co-operates with anchoring means 56 and 57 which are spring means associated with the basin 58.

Uniform rotation of the rotary bodies can be realized by balancing them with the aid of shiftable elements which are preferably mounted on the end walls.

The invention is not restricted to the features described above and shown in the drawings but can be modified within the scope of the appendent claims.

What I claim and desire to secure by Letters Patent is:

1. An apparatus for the purification of a liquid by aeration which comprises at least one closed body having at least one ingress and one egress opening, means for containing a quantity of said liquid, means for rotating said body, said body having buoyancy of its own, whereby said closed body is supported by said liquid, said closed body floating in said liquid irrespective of the amount of said liquid within the body during rotation, contact means within the body comprising a partition adapted to drive said liquid from said ingress opening to the center of said body and to the egress opening during rotation, said liquid being forced to pass both sides of the partition, said body admitting alternately said liquid and air during rotation.

2. A rotary apparatus as defined in claim 1, wherein the egress opening of the rotary apparatus is connected to a channel element which is adapted to adjust itself automatically to the levels of the medium of greater density and thus to the level of the egress opening.

3. A rotary apparatus as defined in claim 1, wherein a frame carried by the rotary apparatus is provided to stabilize the floating position of said apparatus.

4. A rotary apparatus as defined in claim 3, wherein the stabilizing frame has drives for the rotary body.

5. A rotary apparatus as defined in claim 3, wherein the stabilizing frame is provided with additional floating bodies.

6. A rotary apparatus as defined in claim 3, wherein the stabilizing frame is provided with stabilizing weights.

7. A rotary apparatus as defined in claim 3, wherein the stabilizing frame co-operates with anchoring means.

8. The apparatus according to claim 1, wherein said means for rotating the body are a tubular flexible drive shaft.

9. The apparatus according to claim 1, wherein said contact means are a spiral partition.

10. The apparatus according to claim 7, wherein said anchoring means are spring means.

* * * * *